US009478047B2

United States Patent
Seong et al.

(10) Patent No.: US 9,478,047 B2
(45) Date of Patent: Oct. 25, 2016

(54) APPARATUS AND METHOD FOR RECONSTRUCTING IMAGES BY DISPLAYING USER INTERFACE INDICATING IMAGE RECONSTRUCTION MODES

(71) Applicant: Samsung Electronics Co., Ltd., Suwon-si (KR)

(72) Inventors: Yeol-min Seong, Seoul (KR); Yang-lim Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 14/312,230

(22) Filed: Jun. 23, 2014

(65) Prior Publication Data

US 2015/0036907 A1    Feb. 5, 2015

(30) Foreign Application Priority Data

Aug. 2, 2013    (KR) .................. 10-2013-0092245

(51) Int. Cl.
*G06K 9/00* (2006.01)
*G06T 11/00* (2006.01)
*G06T 3/40* (2006.01)

(52) U.S. Cl.
CPC ........... *G06T 11/003* (2013.01); *G06T 3/4053* (2013.01)

(58) Field of Classification Search
None
See application file for complete search history.

(56) References Cited

U.S. PATENT DOCUMENTS 6,275,562 B1    8/2001    He et al.
6,404,841 B1    6/2002    Pforr et al.
(Continued)

FOREIGN PATENT DOCUMENTS

| JP | 11-347026 A | 12/1999 |
|---|---|---|
| JP | 2002-533150 A | 10/2002 |
| JP | 2005-323628 A | 11/2005 |

(Continued)

OTHER PUBLICATIONS

Communication dated Aug. 19, 2014, issued by the Korean Intellectual Property Office in counterpart Korean Application No. 10-2013-0092245.

(Continued)

*Primary Examiner* — Tahmina Ansari
(74) *Attorney, Agent, or Firm* — Sughrue Mion, PLLC

(57) ABSTRACT

Provided are a medical imaging apparatus and a method of reconstructing an image capable of selecting an image reconstruction mode. The method of reconstructing an image using a medical imaging apparatus may include displaying a user interface indicating at least one of a first mode for reducing time required for reconstruction of the image and a second mode for acquiring the image with high resolution, receiving an input selecting one of the first mode and the second mode as a selected mode, displaying at least one reconstruction option corresponding to the selected mode, receiving another input selecting at least one reconstruction option among the at least one displayed reconstruction option, and reconstructing the image according to the at least one selected reconstruction option and selected mode.

13 Claims, 9 Drawing Sheets

(56) References Cited

U.S. PATENT DOCUMENTS

| | | | |
|---|---|---|---|
| 6,611,575 B1* | 8/2003 | Alyassin | A61B 6/032 378/197 |
| 7,051,286 B1 | 5/2006 | Stemmer et al. | |
| 7,082,181 B2* | 7/2006 | Nishide | G06T 11/005 378/19 |
| 8,532,422 B2 | 9/2013 | Tanabe et al. | |
| 2005/0074155 A1* | 4/2005 | Alyassin | G06T 5/007 382/131 |
| 2007/0176900 A1* | 8/2007 | Nagar | G06F 3/04812 345/159 |
| 2010/0092056 A1* | 4/2010 | Rofsky | G01R 33/54 382/131 |
| 2015/0036907 A1* | 2/2015 | Seong | G06T 3/4053 382/131 |

FOREIGN PATENT DOCUMENTS

| | | |
|---|---|---|
| WO | 2010/016263 A1 | 2/2010 |
| WO | 2010/082101 A1 | 7/2010 |
| WO | 2011/161558 A1 | 12/2011 |
| WO | 2012/017345 A1 | 2/2012 |

OTHER PUBLICATIONS

Communication dated Feb. 4, 2015 issued by Korean Intellectual Property Office in counterpart Korean Application No. 10-2013-0092245.

Communication dated Apr. 14, 2015 issued by European Patent Office in counterpart European Application No. 14175800.3.

Klukowska Joanna et al., "SNARK09—A software package for reconstruction of 2D images from 1D projections", Computer Methods and Programs in Biomedicine, 2013, 18 pp total, vol. 110 No. 3, USA.

Barabas Jan et al., "Analysis, 3D reconstruction and anatomical feature extraction from medical images", Biomedical Engineering and Biotechnology (ICBEB), May 28, 2012, 8 pp total, IEEE, Slovakia.

* cited by examiner

APPARATUS AND METHOD FOR RECONSTRUCTING IMAGES BY DISPLAYING USER INTERFACE INDICATING IMAGE RECONSTRUCTION MODES

CROSS-REFERENCE TO RELATED APPLICATION

This application claims priority from Korean Patent Application No. 10-2013-0092245, filed on Aug. 2, 2013, in the Korean Intellectual Property Office, the disclosure of which is incorporated herein by reference in its entirety.

BACKGROUND

1. Field

Apparatuses and methods consistent with exemplary embodiments relate to a medical imaging system and method, and more particularly, to image reconstruction in a medical imaging apparatus.

2. Description of the Related Art

With the advancement in technology, various medical equipment for surgery or diagnosis has enjoyed widespread use. Among these, medical imaging devices are used to observe the internal states of a human body.

Some examples of medical imaging devices include a computed tomography (CT) apparatus, a magnetic resonance imaging (MRI) apparatus, a single-photon emission computed tomography (SPECT) apparatus, and a positron emission tomography—CT (PET-CT) apparatus. These medical imaging devices play a role in providing anatomical image information. For example, an MRI apparatus is designed to obtain images by using a frequency conversed signal generated during magnetization and relaxation of hydrogen atoms in a human body. The MRI apparatus exhibits excellent contrast between different soft tissues to provide detailed anatomical image information.

MRI equipment requires a considerable amount of time between scanning and acquisition/display of a final image. Thus, various methods may be used to shorten the time needed to go from scanning to displaying a final image. However, shortening the time taken to display a final image may generally reduce a Signal to Noise Ratio (SNR) or a resolution of the final image. In response, various methods may be used to acquire a high resolution or high SNR image.

When a user selects a parameter for taking an MR image, an MRI apparatus provides an image in which an effect of applying the selected parameter has been reflected. For example, if the user adjusts a radio frequency (RF) pulse type, a magnetic gradient, or a slew rate the MRI apparatus takes MR images having different specific absorption rates (SARs) of electromagnetic waves or slice profile qualities.

Furthermore, in a CT apparatus and other medical imaging equipment, various methods may be implemented to shorten the time needed to acquire a final image, or to acquire a high resolution final image.

However, there is a need for a separate method and apparatus for providing an image by selecting an image reconstruction method that allows a user to simply obtain a desired effect in an image reconstruction operation that may affect the reconstruction speed or quality of an image.

SUMMARY

One or more exemplary embodiments include a method and apparatus for reconstructing an image, which allow a user to simply select an image reconstruction method for achieving an effect and provide an image reconstructed according to the selected image reconstruction method.

Additional aspects will be set forth in part in the description which follows and, in part, will be apparent from the description, or may be learned by practice of the presented embodiments.

According to an aspect of an exemplary embodiment, there is provided a method of reconstructing an image using a medical imaging apparatus, the method including displaying a user interface indicating at least one of a first mode for reducing time required for reconstruction of the image and a second mode for acquiring the image with high resolution, receiving an input selecting one of the first mode and the second mode as a selected mode, displaying at least one reconstruction option corresponding to the selected mode, receiving another input selecting at least one reconstruction option among the at least one displayed reconstruction option, and reconstructing the image according to the at least one selected reconstruction option and selected mode.

The method may further include determining an image reconstruction process based on the at least one selected reconstruction option, wherein in the reconstructing of the image, the image is reconstructed according to the determined image reconstruction process.

The at least one reconstruction option displayed in response to the first mode being selected may be at least one of a two-dimensional (2D) multi-slice method, compressive sensing, parallel image processing, and a phase partial Fourier technique.

The at least one reconstruction option displayed in response to the second mode being selected may be Super Resolution processing.

The displaying the user interface may further include displaying a third mode, and wherein the reconstructing of the image further includes reconstructing the image according to a preset default image reconstruction process in response to the third mode being selected.

According to an aspect of an exemplary embodiment, there is provided a medical imaging apparatus including an output unit configured to display a user interface indicating at least one of a first mode for reducing time required for reconstruction of an image and a second mode for acquiring the image with high resolution, and at least one reconstruction option corresponding to a selected mode between the first mode and the second mode, an input unit configured to receive an input selecting one of first mode and the second mode, and another input selecting one of the at least one reconstruction option displayed on the output unit, and an image processor configured to reconstruct the image according to the at least one reconstruction option selected.

The image processor may be further configured to determine an image reconstruction process based on the at least one selected reconstruction option and reconstruct the image according to the determined image reconstruction process.

The apparatus may further include a pipelining unit configured to transmit, to the image processor, a pipelining flag corresponding to the selected at least one reconstruction option, wherein the image processor is further configured to determine the image reconstruction process based on the pipelining flag.

The at least one reconstruction option displayed in response to the first mode being selected may be at least one of a two-dimensional (2D) multi-slice method, compressive sensing, parallel image processing, and a phase partial Fourier technique.

The at least one reconstruction option displayed in response to the second mode being selected may be Super Resolution processing.

The method may be stored on a non-transitory computer-readable recording medium having recorded thereon a program for executing the method on a computer.

According to an aspect of an exemplary embodiment, there is provided a method of reconstructing an image using a medical imaging apparatus, the method including displaying a user interface indicating a first mode for reducing time required for reconstruction of the image, a second mode for acquiring the image with high resolution, and a third mode for reconstructing the image according to a default image reconstruction process, receiving an input selecting one of the first mode, the second mode, and the third mode as a selected reconstruction mode, and reconstructing the image according to the selected reconstruction mode.

According to an aspect of an exemplary embodiment, there is provided a medical imaging apparatus including, an output unit configured to display a user interface configured to receive an input selecting one of a plurality of reconstruction modes including a first mode for reducing time required for reconstruction of an image, a second mode for acquiring the image with high resolution, and a third mode for reconstructing the image according to a default image reconstruction process, an input unit configured to receive an input selecting one of the plurality of reconstruction modes using the user interface displayed on the output unit, and an image processor configured to reconstruct the image according to the one of the plurality of reconstruction modes selected.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
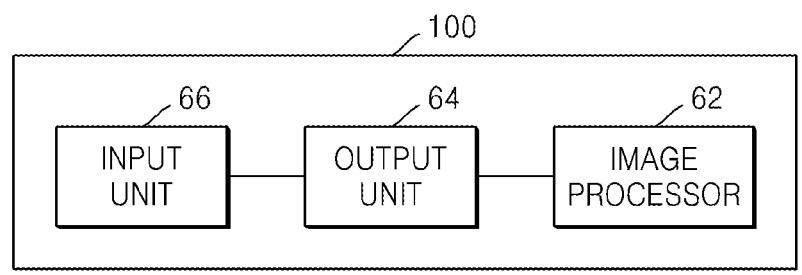
FIG. 1 is a diagram showing a structure of a medical imaging apparatus according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. These exemplary embodiments are provided so that this disclosure will be thorough and complete and will fully convey the exemplary embodiments to those of ordinary skill in the art.

The terms used herein will be first described briefly, and then exemplary embodiments will be described in greater detail.

Although the terms used herein are generic terms which are currently widely used and are selected by taking into consideration functions thereof in the exemplary embodiments, the meanings of the terms may vary according to the intentions of one of ordinary skill in the art, legal precedents, or the emergence of new technologies. Furthermore, some specific terms may be randomly selected by the applicant, in which case the meanings of the terms may be specifically defined in the description of the exemplary embodiments. Thus, the terms should be defined not by simple appellations thereof but based on the meanings thereof and the context of the description of the exemplary embodiments. As used herein, the term "and/or" includes any and all combinations of one or more of the associated listed items. Expressions such as "at least one of," when preceding a list of elements, modify the entire list of elements and do not modify the individual elements of the list.

It will be understood that when the terms "includes", "comprises", "including", and/or "comprising" when used in this specification, specify the presence of stated elements and/or components, but do not preclude the presence or addition of one or more elements and/or components thereof. The term "module" as used herein means, but is not limited to, a software or hardware component, such as FPGA or ASIC. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality of the components and modules may be combined into fewer components and modules or further separated into additional components and modules.

In this specification, an "image" means multi-dimensional data consisting of discrete image elements such as pixels in a two-dimensional (2D) image or voxels in a three-dimensional (3D) image. For example, the image may include medical images of an object that are acquired by using an X-ray machine, a Computed Tomography (CT) system, a Magnetic Resonance Imaging (MRI) system, an ultrasound system, and other medical imaging systems.

An "object" may mean a human body or animal, or any portion of the human body or animal. For example, the object may include internal organs, such as the liver, the heart, the uterus, the brain, a breast, and the abdomen, or blood vessels. The object may also include a phantom. A phantom means a material having a volume closely approximating the density and effective atomic number of living tissue and may include a spherical phantom having similar properties to human tissue.

A "user" means a medical expert, and may include, but is not limited to, a doctor, a nurse, a medical technologist, a medical imaging expert, a radiologist, and a medical equipment repair technician.

An "MR image" refers to an image of an object that is acquired by using the principle of nuclear magnetic resonance (NMR).

A "pulse sequence" is a sequence of signals which are repeatedly applied in an MRI system. The pulse sequence may include time parameters of a radio frequency (RF) pulse, such as Repetition Time (TR) and Time to Echo (TE).

A "pulse sequence diagram (PSD)" is a diagram for explaining the sequence of events that occur within an MRI system. For example, the PSD may be a diagram showing RF pulses, gradient magnetic fields, and MR signals according to time.

The term " . . . unit" used in the embodiments indicates a component including software or hardware, such as a Field Programmable Gate Array (FPGA) or an Application-Specific Integrated Circuit (ASIC), and the " . . . unit" performs certain roles. However, the " . . . unit" is not limited to software or hardware. The " . . . unit" may be configured to be included in an addressable storage medium or to reproduce one or more processors. Therefore, for example, the " . . . unit" includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and " . . . units" may be combined into a smaller number of components and " . . . units", or further divided into additional components and " . . . units".

An MRI system acquires images of cross-sections of an object by representing, as contrast, the intensities of MR signals in response to RF signals generated at a magnetic field having a particular strength. For example, placing an object in a strong magnetic field and applying an RF signal instantaneously to the object may cause only a nucleus of a particular atom (e.g., a nucleus of a hydrogen atom) to resonate. When the RF signal is turned off, an MR signal may then be emitted from the nucleus of the particular atom. The MRI system may then receive the MR signal to obtain an MR image. The MR signal means an RF signal radiated from the object. A magnitude of the MR signal may be determined by the concentration of a predetermined atom (e.g., hydrogen atom) in the object, T1 and T2 relaxation times, and a flow such as the bloodstream.

An MRI system has different properties than other imaging devices. Unlike imaging devices, such as computed tomography (CT) equipment in which image acquisition depends on an orientation of detecting hardware, the MRI system may acquire a 2D image or 3D volume image oriented toward an arbitrary point. Furthermore, unlike CT, X-ray, positron emission tomography (PET), and single-photon emission computed tomography (SPECT) systems, the MRI system may prevent exposure of radioactive rays to an object and an examinee, and may acquire images with high soft tissue contrast. Thus, the MRI system allows acquisition of images requiring clear representation of abnormal tissue, such as neurological images, intravascular images, musculoskeletal images, and oncologic images.

Although a medical imaging apparatus is hereinafter referred to as an MRI apparatus or MRI system for convenience of explanation, the exemplary embodiments are not limited thereto. Exemplary embodiments may be applied to all types of medical imaging apparatuses, including CT equipment, that perform image reconstruction.

Exemplary embodiments will now be described more fully hereinafter with reference to the accompanying drawings so that they may be easily implemented by one of ordinary skill in the art. Parts not related are omitted to clarify the description of exemplary embodiments.

FIG. 1 is a diagram showing a structure of a medical imaging apparatus 100 for reconstructing images, according to an exemplary embodiment.

The medical imaging apparatus 100 according to the exemplary embodiment includes an input unit 66 for processing a user input for manipulating the medical imaging apparatus 100, an output unit 64 for outputting an image or a user interface, and an image processor 62 for processing images.

The output unit 64 may be realized by a display device for displaying an image and may also include an audio output device. For example, the output unit 64 may be a liquid crystal display (LCD), a cathode ray tube (CRT) display, a thin-film transistor (TFT) display, an organic light-emitting diode (OLED) display, a projector.

The input unit 66 may include various input devices for processing user inputs. For example, the input unit 66 may include a microphone, a camera sensor, a touch panel, a trackball, a keyboard, or other various buttons. Furthermore, according to the exemplary embodiment, the input unit 66 and the output unit 64 form a layer structure, such as a touch screen.

In an exemplary embodiment, the output unit 64 may display a user interface for selecting a reconstruction mode desired by a user between a first mode and a second mode. In this case, the first mode may be an image reconstruction mode for further shortening the time it takes to reconstruct an image. The second mode may be an image reconstruction mode for acquiring a reconstructed image with high resolution. The user interface may be a graphical user interface (GUI) that allows the user to select one of a plurality of modes. For example, the user interface may be implemented by graphics for selecting one item in a list such as a dropdown menu. However, the exemplary embodiments are not limited thereto. The user interface displayed on the output unit 64 may include an additional reconstruction mode as well as the first and second modes, or include only one of the first and second modes. Further, according to an exemplary embodiment, there may be provided a gradient of other modes wherein each provides a different balance between image quality and time required to produce the image output.

A user who manipulates a medical imaging system may select one of the first and second modes by using the input unit 66. If the first mode is selected, the output unit 64 may display a reconstruction option for reducing the time required for image reconstruction. The time required for image reconstruction may be the amount of time that elapses between when the image processor 62 receives an MR signal and when a reconstructed image is output. If the second mode is selected, the output unit 64 may display a reconstruction option for acquiring a reconstructed image with high resolution.

For example, the reconstruction option for reducing the time required for image reconstruction may include at least one of a 2D multi-slice method, compressive sensing, parallel image processing, and a phase partial Fourier technique. However, the exemplary embodiments are not limited thereto, and the reconstruction option may further include one or more other methods or not include one or more of the above methods.

In the 2D multi-slice method, images may be reconstructed in the order from data acquired before obtaining the entire 3D volume of data. The 2D multi-slice method will be described later in detail with reference to FIG. 9. In compressive sensing, during conversion of an analog signal into digital data by sampling, the original analog signal may be reconstructed without being sampled at a frequency above a Nyquist frequency that is twice the frequency of the analog signal.

Parallel image processing may be used to simultaneously process a plurality of images.

The phase partial Fourier technique is a method whereby k-space data is partially sampled and the skipped data is replaced with other data.

For example, the reconstruction option for acquiring a reconstructed image with high resolution may include Super Resolution reconstruction or increasing a Signal-to-Noise Ratio (SNR) or resolution by adaptively combining image data. However, the exemplary embodiments are not limited thereto.

The Super Resolution reconstruction includes calculating an average value of a plurality of images in order to improve an SNR, producing a shifted multi-slice when the average value is calculated, and reconstructing an image from the shifted multi-slice, thereby enhancing a resolution of the reconstructed image.

When the first mode or the second mode is selected, a reconstruction option corresponding to another mode may not necessarily be displayed on the output unit 64. A reconstruction option corresponding to the selected mode may be displayed at the top of the output unit 64 while a reconstruction option corresponding to an unselected mode may be displayed blurrily. That is, a reconstruction option may be displayed in various ways depending on an application.

The user who manipulates the medical imaging system may select at least one from among the displayed reconstruction options by using the input unit 66.

In an exemplary embodiment, the image processor 62 may reconstruct an image according to the selected reconstruction option. For example, if a '2D multi-slice method' is selected as a reconstruction option, the image processor 62 may reconstruct an image according to the 2D multi-slice method.

Figure 2:
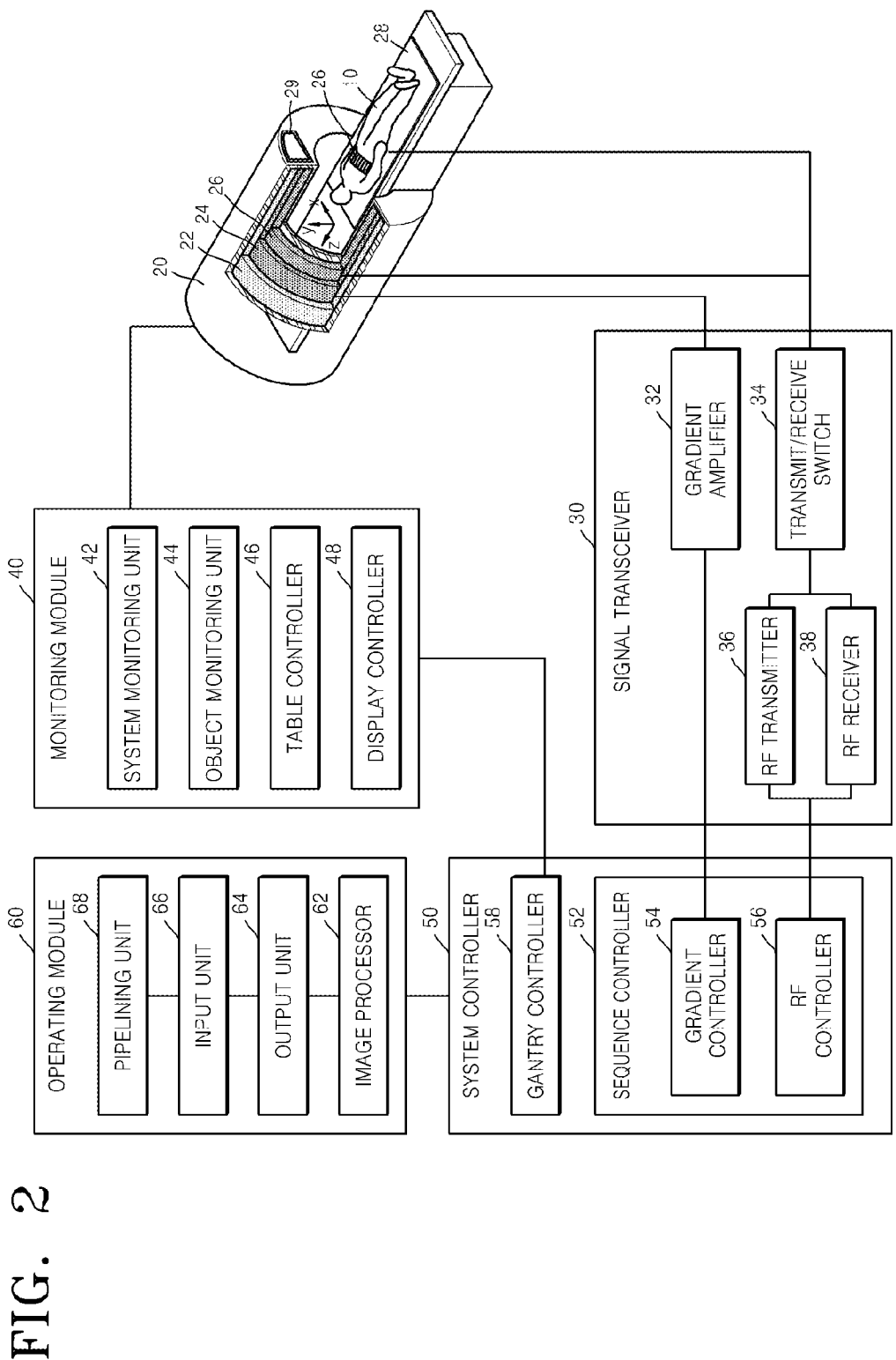
FIG. 2 is a schematic diagram of a magnetic resonance imaging (MRI) system according to an exemplary embodiment.

FIG. 2 is a schematic diagram of an MRI system according to an exemplary embodiment. Referring to FIG. 2, the MRI system according to the exemplary embodiment includes a gantry 20, a signal transceiver 30, a monitoring module 40, a system controller 50, and an operating module 60.

The gantry 20 blocks electromagnetic waves generated by a main magnet 22, a gradient coil 24, and an RF coil 26 from being radiated outside. A static magnetic field and a gradient magnetic field are formed in a bore of the gantry 20, and an RF signal is transmitted toward an object 10.

The main magnet 22, the gradient coil 24, and the RF coil 26 may be arranged along a predetermined direction of the gantry 20. The predetermined direction may include a direction of a coaxial cylinder. The object 10 may be placed on a table 28 that can be inserted into the cylinder along a horizontal axis of the cylinder.

The main magnet 22 produces a static magnetic field that causes magnetic dipole moments of atomic nuclei of the object 10 to be aligned in a predetermined direction. As a magnetic field generated by the main magnet 22 becomes stronger and more uniform, it may be possible to acquire more precise and accurate MR images of the object 10.

The gradient coil 24 includes X, Y, and Z coils that respectively produce gradient magnetic fields in directions of X-, Y-, and Z-axes that are perpendicular to one another.

The gradient coil 24 causes resonant frequencies to change of a part of the object 10 and provides information about the position of that part of the object 10.

The RF coil 26 transmits an RF signal to the object 10, such as a patient, and receives an MR signal emitted from the patient. More specifically, the RF coil 26 may transmit an RF signal having the same frequency as a precession frequency toward atomic nuclei that undergo a precessional motion, stop the transmission of the RF signal, and receive an MR signal emitted from the patient.

For example, to excite an atomic nucleus from a low to a high energy state, the RF coil 26 may produce an electromagnetic wave signal, such as an RF signal, having an RF frequency corresponding to the type of the atomic nucleus, and apply the same to the object 10. Upon application of the electromagnetic wave signal to the atomic nucleus, the atomic nucleus may be excited from a low to a high energy state. Thereafter, when the electromagnetic wave signal disappears, the atomic nucleus undergoes a change in energy level from a high to a low energy state and emits electromagnetic waves having a Larmor frequency. The RF coil 26 then receives the electromagnetic wave signal emitted from atomic nuclei of the object 10.

The RF coil 26 may be realized as a single RF transceiver coil having both functions of generating electromagnetic waves having RF frequencies corresponding to the type of atomic nuclei and of receiving electromagnetic waves emitted from atomic nuclei. Alternatively, the RF coil 26 may be implemented separately as a transmitter RF coil for generating electromagnetic waves having RF frequencies corresponding to the type of atomic nuclei and a receiver RF coil for receiving electromagnetic waves emitted from atomic nuclei.

The RF coil 26 may also be fixedly or removably attached to the gantry 20. When the RF coil 26 is removable, the RF coil 26 may include coils for portions of the object 10 such as a head RF coil, a breast RF coil, a leg RF coil, a neck RF coil, a shoulder RF coil, a wrist RF coil, and an ankle RF coil.

The RF coil 26 may also communicate with an external device in a wired and/or wireless manner, and perform dual tone communication according to a communication frequency spectrum.

The RF coil 26 may also include a birdcage coil, a surface coil, and/or a transverse electromagnetic (TEM) coil depending on the structure of coils.

The RF coil 26 may also be classified into transmit only coils, receive only coils, and transmit/receive coils according to a method of transmitting and/or receiving an RF signal.

The RF coil 26 may also include RF coils using various channels, such as 16, 32, 72, and 144 channels.

The gantry 20 may further include a display 29 disposed on the outside thereof and a display disposed on the inside thereof so as to provide predetermined information to a user or the object 10.

The signal transceiver 30 controls a gradient magnetic field formed in the interior space of the gantry 20 according to a predetermined MR sequence, as well as transmission and/or reception of RF signals and MR signals.

The signal transceiver 30 may include a gradient amplifier 32, a transmit/receive switch 34, an RF transmitter 36, and an RF receiver 38.

The gradient amplifier 32 drives the gradient coil 24 housed in the gantry 20 and is controlled by a gradient controller 54 to provide a pulse signal used to form a gradient magnetic field. By controlling pulse signals provided by the gradient amplifier 32 to the gradient coil 24, gradient magnetic fields in the directions of the X-, Y-, and Z-axes may be combined together.

The RF transmitter 36 and the RF receiver 38 may drive the RF coil 26. The RF transmitter 36 may provide an RF pulse having a Larmor frequency to the RF coil 26, while the RF receiver 38 may receive an MR signal received by the RF coil 26.

The transmit/receive switch 34 may adjust the direction in which the RF signal and the MR signal are transmitted or received. For example, the transmit/receive switch 34 allows the RF coil 26 to transmit an RF signal to the object 10 in a transmit mode and to receive an MR signal from the object 10 in a receive mode. The transmit/receive switch 34 may be controlled in response to a control signal from an RF controller 56.

The monitoring module 40 may monitor or control the gantry 20 and devices installed on and in the gantry 20. To achieve this, the monitoring module 40 may include a system monitoring unit 42, an object monitoring unit 44, a table controller 46, and a display controller 48.

The system monitoring unit 42 may monitor and control statuses of a static magnetic field, a gradient magnetic field, an RF signal, the table 28, devices for measuring body information about an object, power supply, a heat exchanger, and a compressor.

The object monitoring unit 44 monitors a status of the object 10. To do so, the object monitoring unit 44 may include a camera for observing a movement or position of the object 10, a spirometer for measuring respiration of the object 10, an electrocardiogram (ECG) measurement device for measuring the electrical activity of the heart of the object 10, and a thermometer for taking a body temperature of the object 10.

The table controller 46 controls the movement of the table 28 on which the object 10 is placed. The table controller 46 may control the movement of the table 28 according to a sequence control by a sequence controller 52. For example, for imaging the moving object 10, the table controller 46 may consistently or intermittently move the table 28 according to a sequence control by the sequence controller 52, so that the object 10 may be imaged over an area larger than a field of view (FOV) of the gantry 20.

The display controller 48 may control the display 29 disposed on the outside of the gantry 20 and the display disposed on the inside thereof. In detail, the display controller 48 may control on/off operations of screens to be displayed on the display 29 disposed on the outside of the gantry 20 and the display disposed on the inside thereof. Furthermore, when an audio speaker is located on the inside or outside of the gantry 20, the display controller 48 may control on/off operation of the audio speaker or sound to be output through the audio speaker.

The system controller 50 includes the sequence controller 52 for controlling a sequence of signals produced in the gantry 20, and a gantry controller 58 for controlling devices installed on the gantry 20.

The sequence controller 52 may include the gradient controller 54 for controlling the gradient amplifier 32, and the RF controller 56 for controlling the RF transmitter 36, the RF receiver 38, and the transmit/receive switch 34. The sequence controller 52 may control the gradient amplifier 32, the RF transmitter 36, the RF receiver 38, and the transmit/receive switch 34 in response to a pulse sequence received from the operating module 60. In this case, the pulse sequence includes all information needed to control the gradient amplifier 32, the RF transmitter 36, the RF receiver 38, and the transmit/receive switch 34, such as a strength, a period, and timing of a pulse signal applied to the gradient coil 24.

The operating module 60 may provide pulse sequence information to the system controller 50 while simultaneously controlling the overall operation of the MRI system. The operating module 60 may include an image processor 62 for processing an MR signal received from the RF receiver 38, an output unit 64, an input unit 66, and a pipelining unit 68.

The image processor 62 processes an MR signal received from the RF receiver 38 to create an MR image representing MR image data regarding the object 10.

The image processor 62 may perform various signal processing techniques on the received MR signal, such as amplification, frequency conversion, phase detection, low frequency amplification, and filtering. According to the exemplary embodiment, the image processor 62 may reconstruct an image from an MR signal according to the selected reconstruction option.

For example, the image processor 62 may arrange digital data in a k-space (e.g., referred to as a Fourier domain or frequency domain) set in a memory, and perform a 2D or 3D Fourier Transform on the digital data to reconstruct image data. The pipelining unit 68 may construct a pipeline for a process of reconstructing image data according to a reconstruction option selected through the input unit 66. The image processor 62 may reconstruct image data according to the pipeline. The user may set an image reconstruction algorithm by using the input unit 66.

The image processor 62 may also perform synthesis or a differential operation on image data. The synthesis may include addition of image data on a pixel-by-pixel basis and maximum intensity projection (MIP). The image processor 62 may also store reconstructed image data as well as image data subjected to synthesis or a differential operation in a memory or an external server.

The image processor 62 may also perform various signal processing techniques on the MR signal in a parallel manner. For example, the image processor 62 may perform parallel signal processing on a plurality of MR signals received by a multi-channel RF coil to reconstruct image data from the plurality of MR signals.

The output unit 64 may output image data generated or reconstructed by the image processor 62 to the user. The output unit 64 may include a speaker, a printer, a CRT display, an LCD, a Plasma Display Panel (PDP) display, an OLED display, a Field Emission Display (FED), an LED display, a Vacuum Fluorescent Display (VFD), a Digital Light Processing (DLP) display, a Plasma-filled Diode (PFD) display, a 3D display, a transparent display, and other various output devices which are apparent to one of ordinary skill in the art.

The user may use the input unit 66 to enter information about the object 10, parameters, scan conditions, a pulse sequence, image synthesis, or a differential operation. The input unit 66 may include a keyboard, a mouse, a trackball, voice recognition, gesture recognition, a touch screen, and other various input devices which are apparent to one of ordinary skill in the art.

Although FIG. 2 shows the signal transceiver 30, the monitoring module 40, the system controller 50, and the operating module 60 as separate components, it will be fully understood by one of ordinary skill in the art that functions performed by each of the signal transceiver 30, the monitoring module 40, the system controller 50, and the operating module 60 may be performed by other components. For example, although the image processor 62 has been described to convert an MR signal received by the RF receiver 38 into a digital signal, the RF receiver 38 or the RF coil 26 may directly convert the MR signal into the digital signal.

The gantry 20, the RF coil 26, the signal transceiver 30, the monitoring module 40, the system controller 50, and the operating module 60 may be connected to one another in a wired or wireless manner. When the above-described components are connected to one another via a wireless connection, the MRI system may further include a device for synchronizing clocks driving the components with one another. The gantry 20, the RF coil 26, the signal transceiver 30, the monitoring module 40, the system controller 50, and the operating module 60 communicate with one another using a high-speed digital interface, such as Low Voltage Differential Signaling (LVDS), asynchronous serial communication, such as Universal Asynchronous Receiver Transmitter (UART), synchronous serial communication, a low latency network protocol, such as Controller Area Network (CAN), optical communication, or other various communication methods that are apparent to one of ordinary skill in the art.

Figure 3:
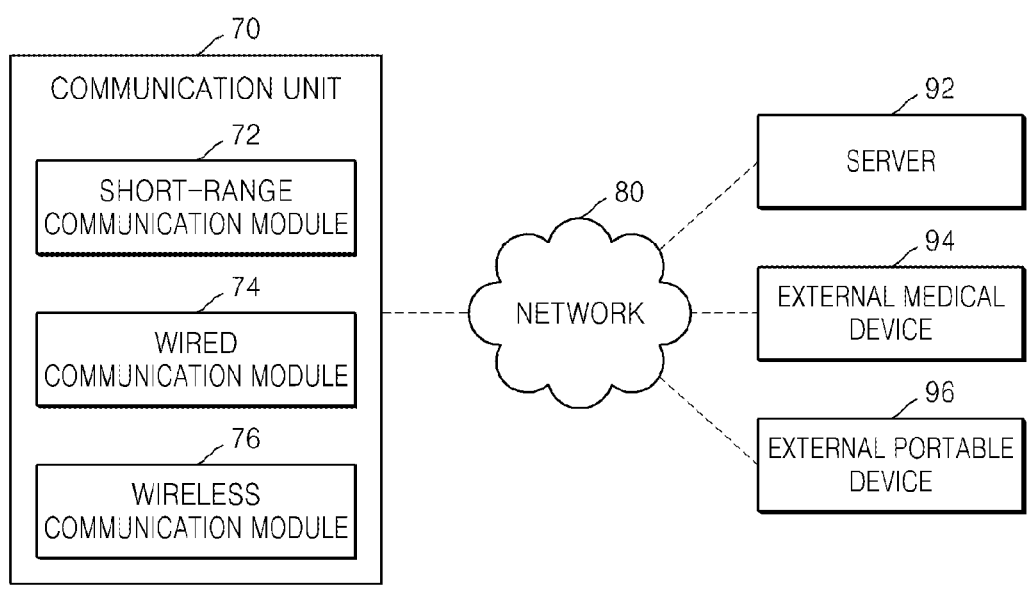
FIG. 3 illustrates a configuration of a communication unit according to an exemplary embodiment.

FIG. 3 illustrates a configuration of a communication unit 70 according to an exemplary embodiment. The communication unit 70 may be connected to at least one of the gantry 20, the signal transceiver 30, the monitoring module 40, the system controller 50, and the operating module 60.

The communication unit 70 may exchange data with a hospital server or other medical devices within a hospital via a picture archiving and communication system (PACS) and perform data communication according to the Digital Imaging and Communications in Medicine (DICOM) standard.

Referring to FIG. 3, the communication unit 70 is connected to a network 80 in a wired or wireless manner to communicate with an external server 92, an external medical device 94, or an external portable device 96.

In detail, the communication unit 70 may transmit or receive data related to diagnosis of an object through the network 80. For example, the communication unit 70 may transmit or receive medical images produced by the external medical device 94 such as a CT, an MRI, or an X-ray imaging system. The communication unit 70 may also receive a patient's diagnosis history or treatment plan from the external server 92 for use in the diagnosis of an object. In addition to communicating with the external server 92 and the external medical device 94, the communication unit 70 may perform data communication with the portable device 96 such as a doctor or client's mobile phone, personal digital assistant (PDA), and notebook computer.

The communication unit 70 may transmit information about operational states of an MRI system or medical image quality to the user and receive a feedback from a user as a response to the information over the network 80.

The communication unit 70 may include one or more components that enable communication with external devices. Referring to FIG. 3, the communication unit 70 includes a short-range communication module 72, a wired communication module 74, and a wireless communication module 76.

The short-range communication module 72 refers to a module for performing short-range communication with a device that is located within a known distance. According to an exemplary embodiment, short-range communication technologies may include Wireless Local Area Network (WLAN), wireless fidelity (Wi-Fi), Bluetooth, ZigBee, Wi-Fi Direct, Ultra Wideband (UWB), Infrared Data Association (IrDA), Bluetooth Low Energy (BLE), and Near Field Communication (NFC).

The wired communication module 74 performs communication using an electrical or optical signal. Wired communication technologies may include technologies using a pair cable, a coaxial cable, and a fiber optic cable and other various wired communication technologies that are apparent to one of ordinary skill in the art.

The wireless communication module 76 transmits or receives a wireless signal to or from at least one of a base station, an external device, and a server on a mobile communication network. In this case, the wireless signal may contain a voice call, a video call, or various types of data associated with transmission and reception of text/multimedia messages FIG. 4 is a flowchart of a process of reconstructing an image, according to an exemplary embodiment.

Figure 4:
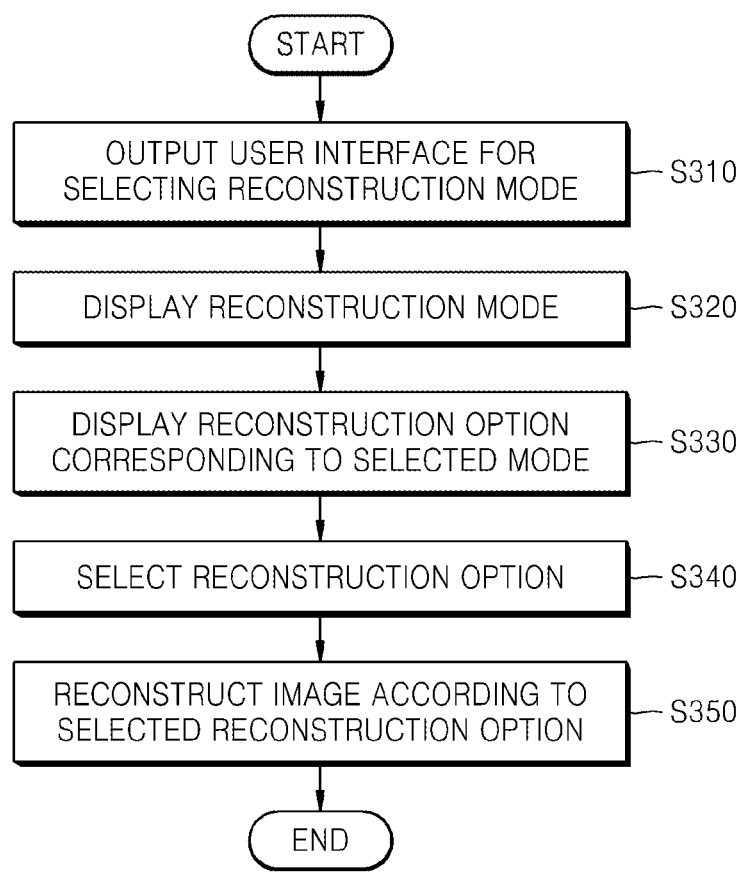
FIG. 4 is a flowchart of a process of reconstructing an image, according to an exemplary embodiment.

Referring to FIG. 4, an MRI system outputs a user interface for selecting a reconstruction mode desired by a user between a first mode and a second mode through an output unit (S310). In this case, the first mode may be an image reconstruction mode for shortening the time it takes to reconstruct an image. The second mode may be an image reconstruction mode for acquiring a reconstructed image with high resolution. The user interface may be a GUI that allows the user to select one of a plurality of modes. For example, the user interface may be implemented by graphics for selecting one item in a list such as a dropdown menu. However, the exemplary embodiments are not limited thereto. The user interface displayed on the output unit may include an additional reconstruction mode as well as the first and second modes, or include only one of the first and second modes.

The user who manipulates the MRI system may select one of the first and second modes by using an input unit (S320). The MRI system displays at least one reconstruction option corresponding to the selected mode on the output unit (S330). If the first mode is selected, the output unit may display reconstruction options for reducing the time required for image reconstruction. The time required for image reconstruction may be the amount of time that elapses between when an image processor receives an MR signal and when a reconstructed image is output. Otherwise, if the second mode is selected, the output unit may display reconstruction options for acquiring a reconstructed image with high resolution.

For example, the reconstruction options for reducing the time required for image reconstruction may include at least one of a 2D multi-slice method, compressive sensing, parallel image processing, and a phase partial Fourier technique. However, the exemplary embodiments are not limited thereto, and the reconstruction options may further include other methods or not include the above methods.

For example, the reconstruction options for acquiring a reconstructed image with high resolution may include Super Resolution reconstruction and increasing an SNR or resolution such as by adaptively combining image data. However, the exemplary embodiments are not limited thereto.

When the first mode or the second mode is selected, a reconstruction option corresponding to another mode may not necessarily be displayed on the output unit. A reconstruction option corresponding to the selected mode may be displayed at the top of the output unit while a reconstruction option corresponding to an unselected mode may be displayed blurrily. The reconstruction options displayed in operation S330 may vary depending on an application.

Then, the MRI system selects one among the reconstruction options displayed in operation S330 according to an input from the user who manipulates the MRI system (S340). Subsequently, during an MRI scan, the MRI system reconstructs an image according to the selected reconstruction option (S350). For example, if reconstruction options indicating 'pipelining using a 2D multi-slice method' and 'partial Fourier transform' are selected, an image may be reconstructed according to an algorithm employing the 2D multi-slice method and partial Fourier transform.

In another exemplary embodiment, operations S330 and S340 may be omitted. In this case, in operation S350, the MRI system may reconstruct an image according to the selected reconstruction mode and not according to the reconstruction option. In other words, an image reconstruction process corresponding to the reconstruction mode displayed in operation S320 may be preset without selection of a reconstruction option.

Figure 5:
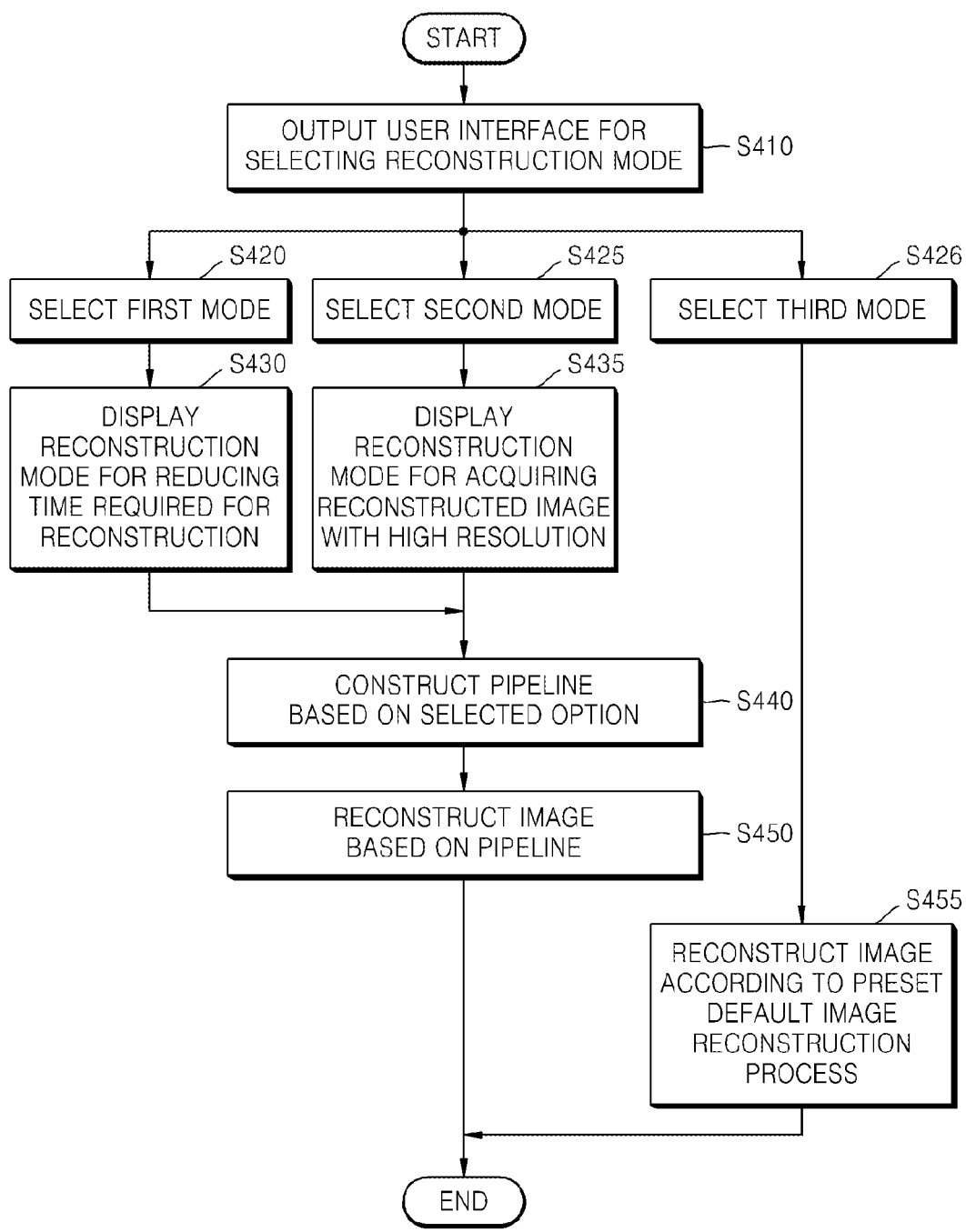
FIG. 5 is a flowchart of a process of reconstructing an image, according to another exemplary embodiment.

FIG. 5 is a flowchart of a process of reconstructing an image, according to another exemplary embodiment.

Referring to FIG. 5, an MRI system outputs a user interface for selecting an image reconstruction mode through an output unit (S410). In this case, image reconstruction modes available for selection may include a first mode for shortening the time it takes to reconstruct an image, a second mode for acquiring a reconstructed image with high resolution, and a third mode for reconstructing an image according to a preset default process. Thereafter, if the first mode is selected (S420), the output unit may display reconstruction options for reducing the time required for image reconstruction (S430). In this case, the time required for image reconstruction may be the amount of time that elapses between when an image processor receives an MR signal and when a reconstructed image is output. If the second mode is selected (S425), the output unit may display reconstruction options for acquiring a reconstructed image with high resolution (S435).

For example, the reconstruction options for reducing the time required for image reconstruction may include at least one of a 2D multi-slice method, compressive sensing, parallel image processing, and a phase partial Fourier technique. However, the exemplary embodiments are not limited thereto, and the reconstruction options may further include another method, or not include the above methods.

For example, the reconstruction options for acquiring a reconstructed image having a high resolution may include Super Resolution reconstruction and increasing an SNR or resolution such as by adaptively combining image data. However, the exemplary embodiments are not limited thereto.

The MRI system then constructs a pipeline for reconstructing an image based on at least one reconstruction option selected from the reconstruction options displayed in operation S430 or S435 (S440). The MRI system may reconstruct an image based on the pipeline (S450). In this case, the pipeline divides command processing into stages to allow overlapping execution of commands during a reconstruction process. For example, when a user selects a 2D multi-slice method as a reconstruction option in operation S430, the image processor may start image reconstruction by using data in a 2D slice that is received although all data for the entire 3D volume is not received, and then perform image reconstruction by using data in the other 2D slices once each of the 2D slices is subsequently received.

If the third mode is selected (S426) through the user interface output in operation S410, the MRI system may reconstruct an image according to a reconstruction process that is set as a default (S455).

Figure 6:
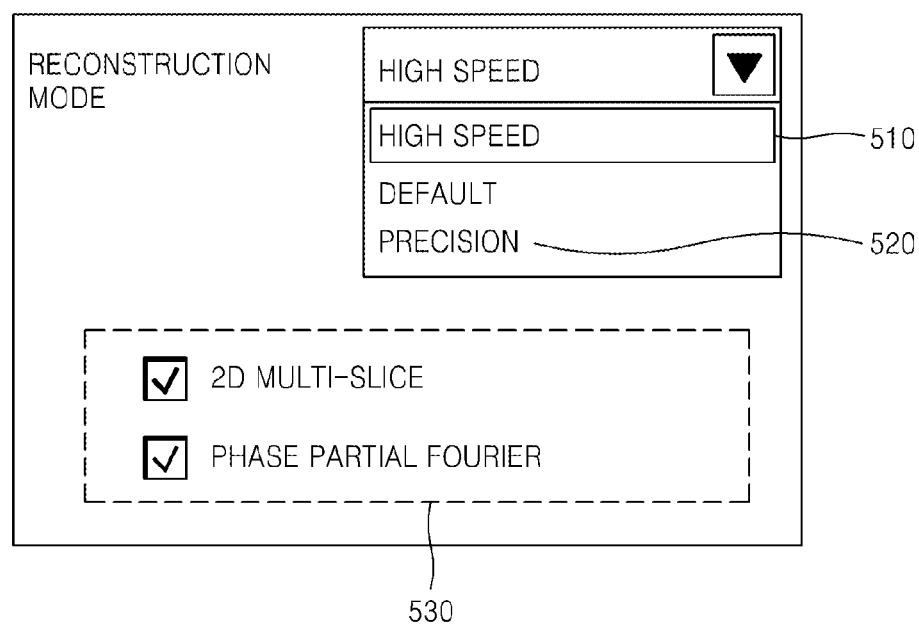
FIG. 6 illustrates a user interface that is output according to an exemplary embodiment.

FIG. 6 illustrates a user interface 500 that is output according to an exemplary embodiment.

Referring to FIG. 6, an MRI system displays the user interface 500 for selecting an image reconstruction mode among reconstruction modes including at least one of a first mode 510 and a second mode 520 through an output unit and for selecting reconstruction options corresponding to the selected image reconstruction mode.

If the first mode 510 is selected, the MRI system may display reconstruction options 530 for reducing the time required for image reconstruction. The user may select a reconstruction option for obtaining an effect among the reconstruction options 530 displayed on the input unit.

Figure 7:
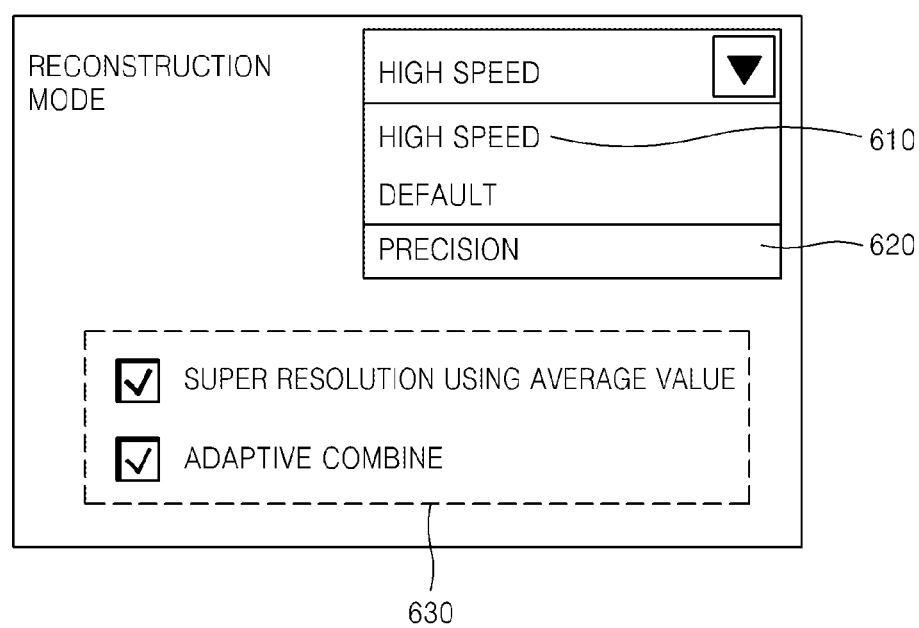
FIG. 7 illustrates a user interface that is output according to another exemplary embodiment.

FIG. 7 illustrates a user interface 600 that is output according to another exemplary embodiment. Referring to FIG. 7, an MRI system displays the user interface 600 for selecting an image reconstruction mode among reconstruction modes including a first mode 610 and a second mode 620 through an output unit and for selecting reconstruction options corresponding to the selected image reconstruction mode.

If the first mode 610 is selected, the MRI system may display reconstruction options 630 for acquiring a reconstructed image with high resolution. The user may select a reconstruction option for obtaining an effect among the reconstruction options 630 displayed on the input unit.

Figure 8:
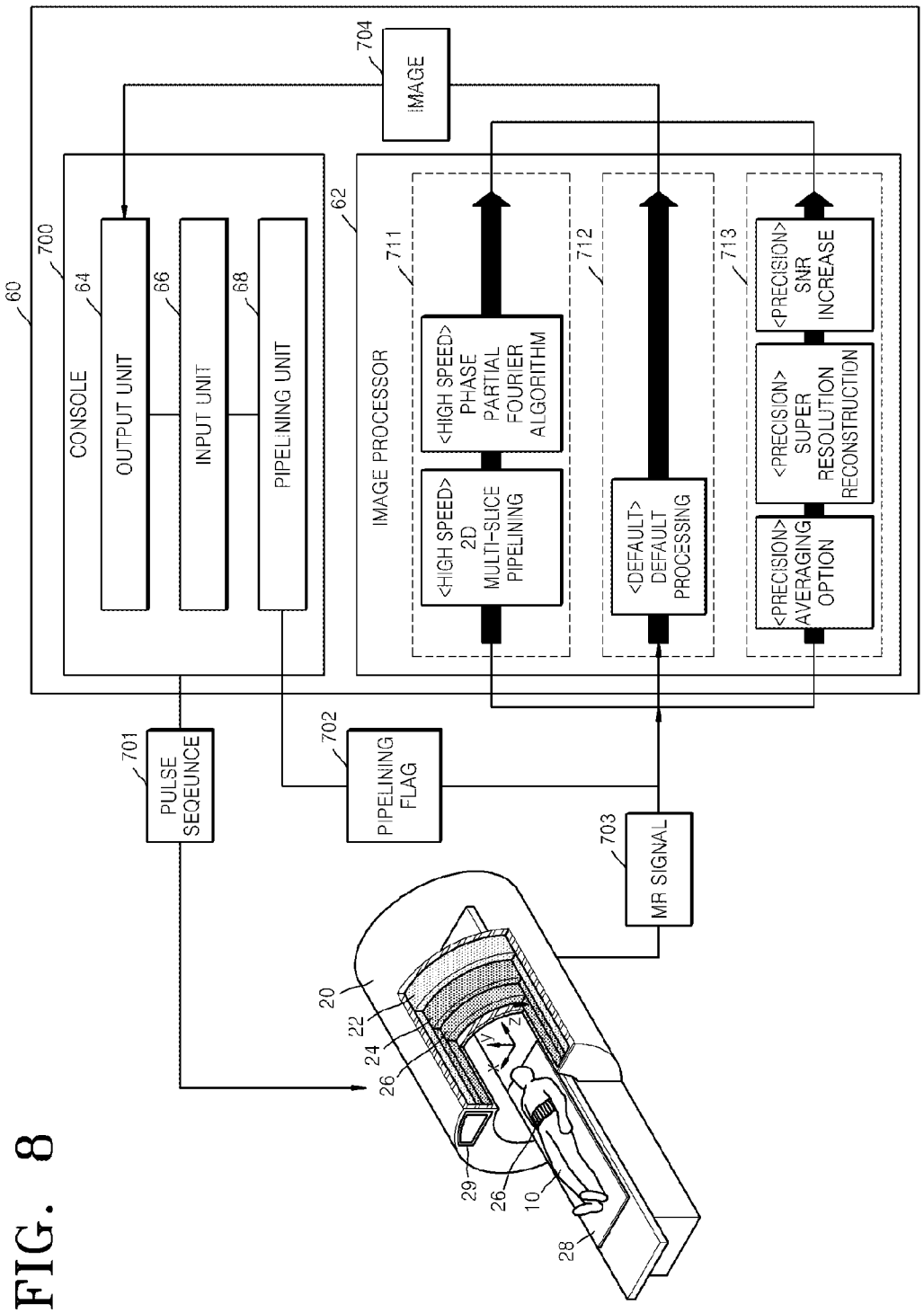
FIG. 8 is a schematic diagram illustrating an MRI system according to another exemplary embodiment.

FIG. 8 is a schematic diagram illustrating an MRI system according to another exemplary embodiment.

Referring to FIG. 8, the MRI system according to the exemplary embodiment includes an operating module 60. The operating module 60 may include a console 700 that allows a user to manipulate an MRI system and an image processor 62. The console 700 includes an output unit 64 for outputting at least one of a user interface and an image 704, an input unit 66 that allows the user to input commands for manipulating the MRI system, and a pipelining unit 68 for constructing a pipeline for an image reconstruction process. MRI settings may be completed by using the user interface displayed on the output unit 64 and the input unit 66, and a command for starting imaging process may be input from the user. In this case, the output unit 64 may display a user interface for selecting a reconstruction mode among reconstruction modes including a first mode and a second mode.

The user who manipulates the MRI system may select one of the first and second modes by using the input unit 66. If the first mode is selected, the output unit 64 may display reconstruction options for reducing the time required for image reconstruction. The time required for image reconstruction may be the amount of time that elapses between when the image processor 62 receives an MR signal and when a reconstructed image is output. If the second mode is selected, the output unit 64 may display reconstruction options for acquiring a reconstructed image with high resolution. The user may select a desired reconstruction option among the displayed reconstruction options by using the input unit 66.

When an MRI command is input, the pipelining unit 68 may create a pipelining flag 702 that allows the image processor 62 to reconstruct an image according to the selected reconstruction option. The operating module 60 may also transmit a pulse sequence for controlling a gradient magnetic field formed in an interior space of a gantry 20. A main magnet 22, a gradient coil 24, and an RF coil 26 may be arranged along a predetermined direction of the gantry 20. An RF signal generated by the main magnet 22, the gradient coil 24, and the RF coil 26 may be transmitted toward an object 10 placed within the gantry 20. A display 29 may be disposed on the outside of the gantry 20, and the table 28 that can be inserted into a cylinder.

The image processor 62 may reconstruct the image 704 from an MR signal 703 acquired by transmitting the RF signal toward the object 10 by using one of the reconstruction processes 711 through 713 corresponding to the pipelining flag 702 received from the pipelining unit 68.

Although the reconstruction processes 711 through 713 are shown together in FIG. 8 for convenience of explanation, all of them are not performed. For example, if the console 700 selects reconstruction options such as 2D multi-slice pipelining and a partial phase Fourier algorithm corresponding to the first mode, the image processor 62 may reconstruct the image 704 according to the reconstruction process 711 employing the 2D multi-slice method and the phase partial Transform algorithm. In another example, if there is no separate setting for a reconstruction process, the image processor 62 may reconstruct the image 704 according to the default reconstruction process 712. In yet another example, if the console 700 selects reconstruction options such as averaging option, Super Resolution reconstruction, and SNR increase corresponding to the second mode, the image processor 62 may reconstruct the image 704 according to the reconstruction process 713 corresponding to the selected reconstruction options.

The output unit 64 may display the image 704 obtained from one of the reconstruction processes 711 through 713.

Figure 9:
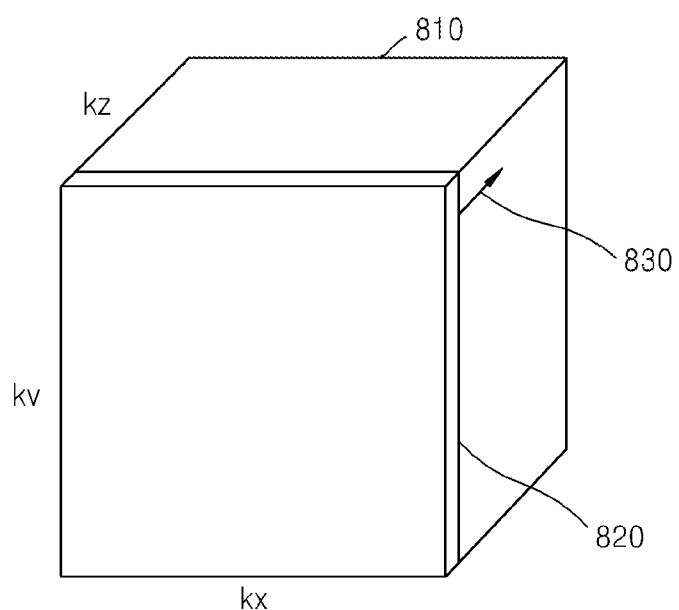
FIG. 9 is a diagram for explaining a two-dimensional (2D) multi-slice method.

FIG. 9 is a diagram for explaining a 2D multi-slice method.

When a 2D multi-slice method is selected as a reconstruction option, an MRI system may reconstruct an image according to the 2D multi-slice method. In general, reconstruction of an original image includes acquiring data from the entire volume 810 in a k-space and reconstructing the original image from the acquired data. However, in the 2D multi-slice method, when data in a slice 820 in a kk-kv plane is acquired, a reconstruction process may be performed on the acquired slice 820. Subsequently, when a slice 830 is sequentially acquired in a kz direction, a reconstruction process is performed on the slice 830. That is, an image processor may begin the reconstruction prior to acquisition of data for the entire volume 810. Thus, use of the 2D multi-slice method may reduce the time required for image construction.

Figure 10:
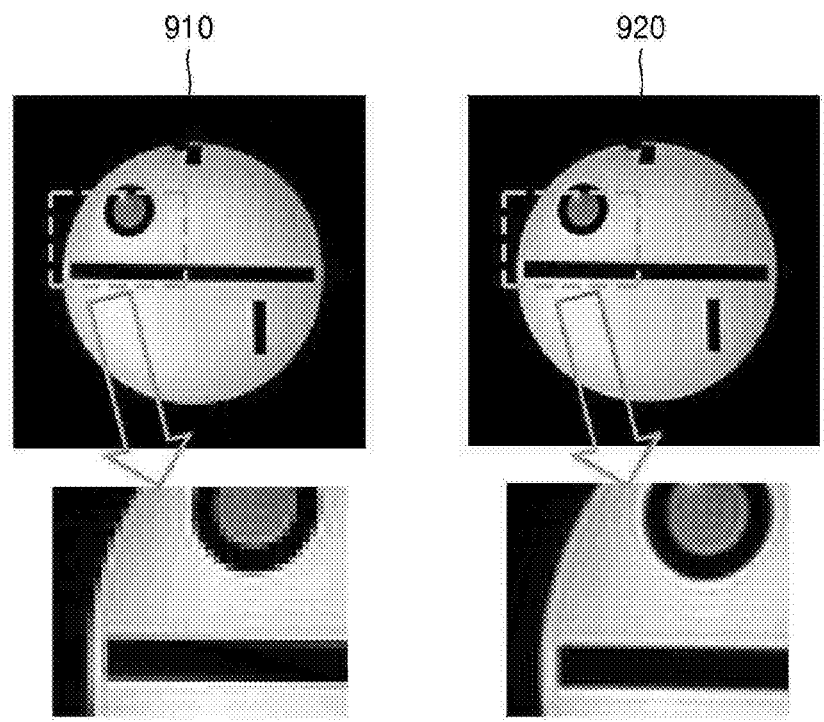
FIG. 10 is a diagram for explaining improvement of resolution by using Super Resolution image processing.

FIG. 10 is a diagram for explaining improvement of resolution by using Super Resolution image processing.

As apparent from FIG. 10, when an image 910 generated according to a default process is compared with an image 920 acquired according to Super Resolution image processing, use of Super Resolution image processing causes the image 920 to appear smoother and clearer than the image 910. In other words, when an image is reconstructed according to the Super Resolution image processing, the resolution of a reconstructed image may be enhanced.

The above methods according to one or more exemplary embodiments can be recorded in programs that can be executed on a computer and be implemented through general purpose digital computers which can run the programs using a computer-readable recording medium.

Examples of the computer-readable recording medium include recording media, such as magnetic storage media (e.g., ROM, floppy disks, hard disks, etc.), and optical recording media (e.g., CD-ROMs or DVDs).

While one or more exemplary embodiments have been described with reference to the figures, it will be understood by those of ordinary skill in the art that various changes in form and details may be made therein without departing from the spirit and scope of the present inventive concept as defined by the following claims. Thus, it should be understood that the exemplary embodiments described therein should be considered in a descriptive sense only and not for purposes of limitation.

The methods and MRI systems for reconstructing an image, according to one or more exemplary embodiments, may reduce the time needed for a user to modify parameters related to image reconstruction. The methods and MRI systems may also allow the user to easily select an image reconstruction mode and facilitate acquisition of an image having a desired effect maximized. Furthermore, the methods and MRI systems may allow a new image reconstruction technique to be displayed as one of image reconstruction options, thereby facilitating application of the new image reconstruction technique to a medical imaging apparatus.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A method of reconstructing an image using a medical imaging apparatus, the method comprising:
   displaying a user interface indicating at least one among a first mode for reducing time required for reconstruction of the image and a second mode for acquiring the image with high resolution;
   receiving an input selecting one among the first mode and the second mode as a selected mode;
   displaying at least one reconstruction option corresponding to the selected mode;
   receiving another input selecting at least one reconstruction option among the at least one displayed reconstruction option; and
   reconstructing the image according to the at least one selected reconstruction option,
   wherein the at least one reconstruction option displayed in response to the receiving the input selecting the first mode as the selected mode, is at least one among compressed sensing, parallel image processing, and a phase partial Fourier technique.

2. The method of claim 1, further comprising:
   determining an image reconstruction process based on the at least one selected reconstruction option,
   wherein the reconstructing comprises reconstructing the image according to the determined image reconstruction process.

3. The method of claim 1, wherein the at least one reconstruction option displayed in response to the receiving the input selecting the second mode as the selected mode, is Super Resolution processing.

4. The method of claim 1, wherein the displaying the user interface comprises displaying a third mode,
   the receiving the input comprises receiving the input selecting the third mode as the selected mode, and
   the reconstructing comprises reconstructing the image according to a preset default image reconstruction process in response to the receiving the input selecting the third mode as the selected mode.

5. A medical imaging apparatus comprising:
   an output interface configured to display a user interface indicating at least one among a first mode for reducing time required for reconstruction of an image and a second mode for acquiring the image with high resolution, and display at least one reconstruction option corresponding to a selected mode between the first mode and the second mode;

an input interface configured to receive an input selecting one among the first mode and the second mode as the selected mode, and receive another input selecting at least one reconstruction option among the at least one displayed reconstruction option; and an image processor configured to reconstruct the image according to the at least one selected reconstruction option, wherein the at least one reconstruction option displayed in response to the input interface receiving the input selecting the first mode as the selected mode, is at least one among compressed sensing, parallel image processing, and a phase partial Fourier technique.

6. The apparatus of claim 5, wherein the image processor is further configured to determine an image reconstruction process based on the at least one selected reconstruction option, and reconstruct the image according to the determined image reconstruction process.

7. The apparatus of claim 6, further comprising:
a console configured to transmit, to the image processor, a pipelining flag corresponding to the at least one selected reconstruction option,
wherein the image processor is further configured to determine the image reconstruction process based on the pipelining flag.

8. The apparatus of claim 5, wherein the at least one reconstruction option displayed in response to the input interface receiving the input selecting the second mode as the selected mode, is Super Resolution processing.

9. A non-transitory computer-readable recording medium having recorded thereon a program for executing the method of claim 1 on a computer.

10. A method of reconstructing an image using a medical imaging apparatus, the method comprising:
displaying a user interface indicating a first mode for reducing time required for reconstruction of the image, a second mode for acquiring the image with high resolution, and a third mode for reconstructing the image according to a default image reconstruction process;
receiving an input selecting one among the first mode, the second mode, and the third mode as a selected reconstruction mode, using the displayed user interface;
displaying at least one reconstruction option corresponding to the selected reconstruction mode;
receiving another input selecting at least one reconstruction option among the at least one displayed reconstruction option; and
reconstructing the image according to the selected reconstruction option,
wherein the at least one reconstruction option displayed in response to the receiving the input selecting the first mode as the selected mode, is at least one among compressed sensing, parallel image processing, and a phase partial Fourier technique.

11. A medical imaging apparatus comprising:
an output interface configured to display a user interface indicating a first mode for reducing time required for reconstruction of an image, a second mode for acquiring the image with high resolution, and a third mode for reconstructing the image according to a default image reconstruction process, and display at least one reconstruction option corresponding to a selected reconstruction mode between the first mode, the second mode, and the third mode;

an input interface configured to receive an input selecting one among the first mode, the second mode, and the third mode as the selected reconstruction mode, using the displayed user interface, and receiving another input selecting at least one reconstruction option among the at least one displayed reconstruction option; and an image processor configured to reconstruct the image according to the selected reconstruction option, wherein the at least one reconstruction option displayed in response to the receiving the input selecting the first mode as the selected mode, is at least one among compressed sensing, parallel image processing, and a phase partial Fourier technique.

12. A method for reconstructing an image using a medical imaging apparatus, the method comprising:
outputting a plurality of image reconstruction modes associated with an image;
receiving a selection of an image reconstruction mode from the plurality of image reconstruction modes;
outputting one or more image reconstruction options corresponding to the selected image reconstruction mode;
receiving another selection of at least one image reconstruction option from the one or more image reconstruction options;
determining an image reconstruction process based on the at least one selected image reconstruction option; and
reconstructing the image based on the image reconstruction process,
wherein the one or more image reconstruction options displayed in response to the receiving the selection of a first mode from the plurality of image reconstruction modes, is at least one among compressed sensing, parallel image processing, and a phase partial Fourier technique.

13. A medical imaging apparatus comprising:
an output interface configured to output a plurality of image reconstruction modes associated with an image;
an input interface configured to receive a selection of an image reconstruction mode from the plurality of image reconstruction modes,
wherein the output interface is further configured to output one or more image reconstruction options corresponding to the selected image reconstruction mode, and
the input interface is further configured to receive another selection of at least one image reconstruction option from the one or more image reconstruction options; and
an image processor configured to determine an image reconstruction process based on the at least one selected image reconstruction option, and reconstruct the image based on the image reconstruction process,
wherein the one or more image reconstruction options displayed in response to the input interface receiving the selection of a first mode from the plurality of image reconstruction modes, is at least one among compressed sensing, parallel image processing, and a phase partial Fourier technique.

* * * * *